(12) United States Patent
Schreiner et al.

(10) Patent No.: US 9,611,627 B2
(45) Date of Patent: Apr. 4, 2017

(54) PRESSURE SUPPLY FOR A WATER SYSTEM

(71) Applicant: Airbus Operations GmbH, Hamburg (DE)

(72) Inventors: Axel Schreiner, Bremen (DE); Paolo Cavarero, Hamburg (DE); Ralf Menshausen, Hamburg (DE); Markus Wirth, Hamburg (DE); Michael Rempe, Hamburg (DE); Carlos Rosero, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 313 days.

(21) Appl. No.: 14/175,329

(22) Filed: Feb. 7, 2014

(65) Prior Publication Data

US 2014/0158242 A1    Jun. 12, 2014

Related U.S. Application Data

(63) Continuation of application No. PCT/EP2012/064503, filed on Jul. 24, 2012.
(Continued)

(30) Foreign Application Priority Data

Aug. 10, 2011 (DE) .................. 10 2011 109 943

(51) Int. Cl.
    *B64D 11/00* (2006.01)
    *E03B 7/07* (2006.01)
    (Continued)

(52) U.S. Cl.
    CPC ............... *E03B 7/07* (2013.01); *B64D 11/00* (2013.01); *B64D 11/02* (2013.01); *E03B 7/075* (2013.01);
    (Continued)

(58) Field of Classification Search
    CPC ......... Y10T 137/3127; Y10T 137/6906; Y10T 137/86002; F04D 15/0066; F04D 13/12; F04D 13/14; B64D 11/00; B64D 11/02
    See application file for complete search history.

(56) References Cited

U.S. PATENT DOCUMENTS 3,602,611 A * 8/1971 Oplander ............... F04D 13/14
                                                415/145
4,239,054 A * 12/1980 Van Rijn ............... E03B 7/075
                                                137/209
(Continued)

FOREIGN PATENT DOCUMENTS

CN          1063519 A     8/1992
CN          1326524 A     12/2001
(Continued)

OTHER PUBLICATIONS

State Intellectual Property Office of the People's Republic of China, Office Action in Chinese Patent Application No. 201280049860.3 mailed Sep. 21, 2015.
(Continued)

*Primary Examiner* — Kevin Murphy
(74) *Attorney, Agent, or Firm* — Lorenz & Kopf, LLP.

(57) ABSTRACT

A pressure supply system for a fresh water system is provided. The pressure supply system includes a water reservoir having a bleed air inlet and a water outlet. The pressure supply system also includes a water pump so as to load water, which is loaded with bleed air pressure, with a further pressure downstream until a predetermined nominal operating pressure range is achieved. As a result, the pressure supply system provides an increased redundancy by pressure generator assemblies which are based on different pressure generation principles.

18 Claims, 1 Drawing Sheet

Related U.S. Application Data

(60) Provisional application No. 61/522,048, filed on Aug. 10, 2011.

(51) Int. Cl.
  *B64D 11/02* (2006.01)
  *E03B 7/09* (2006.01)
  *F02C 9/18* (2006.01)

(52) U.S. Cl.
  CPC .............. *E03B 7/09* (2013.01); *F02C 9/18* (2013.01); *Y10T 137/3127* (2015.04); *Y10T 137/6906* (2015.04); *Y10T 137/86002* (2015.04); *Y10T 137/86171* (2015.04)

(56) References Cited

U.S. PATENT DOCUMENTS

| | | | | |
|---|---|---|---|---|
| 5,135,361 | A * | 8/1992 | Dion | F04D 15/0072 417/2 |
| 5,261,440 | A | 11/1993 | Frank | |
| 5,303,739 | A | 4/1994 | Ellgoth et al. | |
| 5,464,327 | A * | 11/1995 | Horwitz | E03B 5/02 417/12 |
| 5,622,207 | A | 4/1997 | Frank | |
| 5,769,124 | A | 6/1998 | Ehrhardt | |
| 6,024,113 | A * | 2/2000 | Komiya | E03B 7/075 137/208 |
| 6,099,264 | A * | 8/2000 | Du | F04B 49/03 137/494 |
| 6,234,759 | B1 | 5/2001 | Hennel et al. | |
| 6,568,426 | B1 * | 5/2003 | Chapman | F04B 49/02 137/335 |
| 7,234,484 | B2 * | 6/2007 | Laws | E03B 11/02 137/209 |
| 2004/0038089 | A1 | 2/2004 | Hoffjann et al. | |
| 2004/0134533 | A1 * | 7/2004 | Cowan | E03B 1/00 137/209 |
| 2010/0133155 | A1 | 6/2010 | Nolan | |
| 2010/0243581 | A1 | 9/2010 | Williams et al. | |

FOREIGN PATENT DOCUMENTS

| | | |
|---|---|---|
| CN | 201350974 Y | 11/2009 |
| DE | 1229467 B | 11/1966 |
| DE | 3637798 A1 | 5/1988 |
| DE | 42 27 518 A1 | 3/1995 |
| DE | 29822717 U1 | 3/1999 |
| JP | 08131779 A | 5/1996 |

OTHER PUBLICATIONS

State Intellectual Property Office of the People's Republic of China, Office Action in Chinese Patent Application No. 201280049860.3 mailed Feb. 28, 2015.
ISA European Patent Office, International Search Report for Application No. PCT/EP2012/064503, mailed Dec. 20, 2012.
German Patent and Trademark Office, German Office Action for Application No. 102011109943.7, mailed Jul. 26, 2012.
International Searching Authority, Written Opinion for International Application No. PCT/EP2012/064503, mailed Dec. 20, 2012.

* cited by examiner

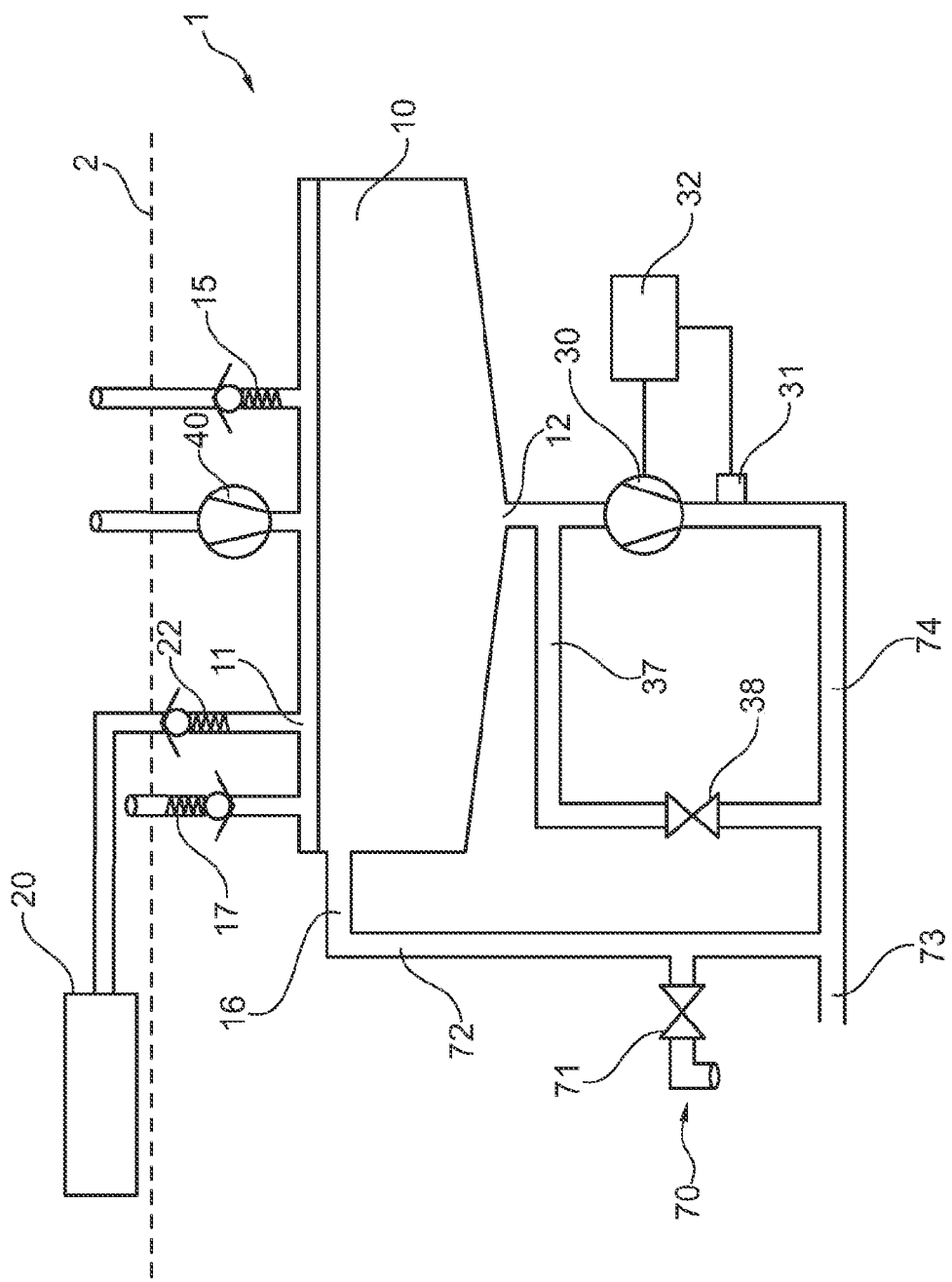

PRESSURE SUPPLY FOR A WATER SYSTEM

CROSS-REFERENCE TO RELATED APPLICATIONS

This application is a continuation of International Application No. PCT/EP2012/064503 filed Jul. 24, 2012, which claims priority to U.S. Provisional Patent Application No. 61/522,048 filed Aug. 10, 2011 and to German Patent Application No. 10 2011 109 943.7 filed Aug. 10, 2011, which are each incorporated herein by reference in their entirety.

TECHNICAL FIELD

The technical field relates to a pressure supply system for a water system. Particularly, the technical field relates to a pressure supply system for a fresh water system in an aircraft, and to an aircraft comprising a corresponding pressure supply system for a fresh water system.

BACKGROUND

So as to ensure in a water system that the water exits, or exits at a sufficiently high pressure, at the corresponding tapping points, for example water taps, it is necessary to load the water in a fresh water system with a pressure which provides that water is conveyed to the water drawing points. In aircraft, a corresponding pressure has been provided in the past for example by loading the water tank with pressure by bleed air from the turbines or engines, or alternatively by generating an air pressure by compressors. Water systems of this type are known for example from DE 42 27 518 A1 or U.S. Pat. No. 5,303,739. As a result of being loaded with pressure, the water was pushed out of the tank into the pipe system as a result of the internal pressure in the tank. If the pressure load is provided by bleed air, this pressure source is no longer available for example when the aircraft is located on the ground with the engines switched off. If compressors are used, increased system weights occur as a result of the redundancy. Further, in the case of parallel redundant pump operation, additional means such as return valves and sensors may in some cases be necessary.

Other objects, desirable features and characteristics will become apparent from the subsequent summary and detailed description, and the appended claims, taken in conjunction with the accompanying drawings and this background.

SUMMARY

According to various embodiments, provided is an optimized water or fresh water supply system.

According to an exemplary embodiment of the present disclosure, a pressure supply system for a fresh water system is provided, comprising a water reservoir having a bleed air inlet and a water outlet, and comprising a water pump, the water pump being arranged downstream from the water outlet, the water pump being configured so as to load water, which is loaded with bleed pressure, with a further pressure downstream until a predetermined nominal operating pressure range is achieved.

In this way, it is possible to provide a particular basic pressure level to a bleed air inlet by way of a bleed air source, the water pump which is arranged downstream loading the water, which is already loaded with pressure by way of the bleed air, with a further water pressure, in such a way that the water pump no longer has to create the entire nominal operating pressure, but merely the missing pressure difference between the bleed air pressure and the nominal operating pressure range. It should be noted that the nominal operating pressure can be within a predetermined pressure range which is achieved under the control of the water pump. Further, for example if the bleed air source fails or there is no bleed air pressure, the water pump alone can build up a particular pressure, in such a way that it is possible to draw water at least in a type of emergency operation. Moreover, for example if the water pump fails, the bleed air source can also provide a pressure which is sufficient for it to be possible to draw water.

In accordance with one embodiment of the present disclosure, the pressure supply system further comprises a water pressure measurement means and a water pump control system, the water pressure measurement means being arranged downstream from the water pump and being coupled back to the water pump control system, the water pump control system being configured to keep a water pressure downstream from the water pump in the predetermined nominal operating pressure range by actuating the water pump.

In this way, by controlling the water pump, the water pressure can be kept in the predetermined nominal operating pressure range without it being necessary to exert an influence on the pressure of the bleed air source.

In accordance with one embodiment of the present disclosure, the water pump is configured in such a way that when deactivated the water pump makes it possible for water to flow through.

In this way, it is possible for even the bleed air alone to push the water into the pipes by loading the water reservoir with pressure, and for the water to be able to flow through the water pump without the water pump having been started up. This is of significance in particular if the bleed air pressure is high enough to shift the water to a minimum operating pressure or the nominal operating pressure range, or if the water pump fails or is inoperative for a variety of reasons.

In accordance with one embodiment of the present disclosure, the water pump is a rotary pump.

In this way, a pump can be provided through which the water can flow even when the pump is idle, in such a way that it is not necessary to operate the pump for water to be drawn.

In accordance with one embodiment of the present disclosure, the pressure supply system has a predetermined minimum operating pressure, the minimum operating pressure being less than the nominal operating pressure range, a bleed air pressure and the water pump being dimensioned in such a way that the bleed air pressure and the water pump can each individually provide at least the minimum operating pressure, and the bleed air pressure and the water pump together can provide at least a pressure range which is within the nominal operating pressure range.

In this way, the water pump can be configured, in terms of power, in such a way that by itself it can for example maintain an emergency operation in the range of the minimum operating pressure, but does not have to provide the entire water pressure for the nominal operating pressure. In this way, the pump may accordingly be dimensioned so as to be small and light.

In accordance with one embodiment of the present disclosure, the bleed air pressure and the water pump are dimensioned in such a way that the bleed air pressure and the water pump can each individually provide a maximum pressure which is below the nominal operating pressure range.

In this way, the bleed air pressure source and/or the water pump are configured in such a way that they do not reach the nominal operating pressure range, since in this way they can be of a smaller, lighter configuration.

In accordance with one embodiment of the present disclosure, the pressure supply system is further configured with an air pump or a compressor, the air pump being configured and arranged in such a way that it can load the water reservoir with pressurized air.

In this way, the pressure supply system can be provided with three pressure generator devices, namely the air pump or the compressor, the bleed air and the water pump, in such a way that if any one of the three assemblies fails, the remaining two assemblies can provide a sufficient pressure, which is at least in the range of the minimum operating pressure, but may also be in the range of the nominal operating pressure range. Further, instead of the bleed air from the engine, a compressor or an air pump may also be used so as to provide a pressure at the bleed air inlet.

In accordance with one embodiment of the present disclosure, the pressure supply system is further provided with a pressure limiting means, which is configured and arranged so as to limit the pressure in the water reservoir to at most the nominal operating pressure range.

In this way, the water reservoir can be set to a water pressure at which when the water is drawn from a tapping point, for example a water tap, the water pressure at this tapping point does not exceed the nominal operating pressure. In this state, water can be drawn from the corresponding tapping points, for example water taps or toilet flushes, at the nominal operating pressure, without the water pump having to be started up.

In accordance with one embodiment of the present disclosure, a return valve is arranged upstream from the bleed air inlet, and is configured so as to prevent air from flowing back towards the bleed air source. In this way, the pressure-loaded water reservoir can be prevented from losing the loaded pressure thereof. Further, air can be prevented from being able to flow back to the bleed air source in particular operating states, for example, if this bleed air source is an engine, in such a way that when the engine power is set low (for example during descent), the air pressure in the water tank is not unintentionally reduced.

In accordance with one embodiment of the present disclosure, the pressure supply system is further provided with a negative pressure protection valve, which is configured and arranged so as to provide the water reservoir with air when there is a negative pressure in the water reservoir.

In this way, for example when the bleed air source fails and when the water pump is in operation, the water pump can be prevented from generating a critical negative pressure in the water reservoir, which could for example cause the water reservoir to collapse under the negative pressure or simply disrupt the water supply.

In accordance with one embodiment of the present disclosure, the pressure supply system is for example provided with a bypass pipe, which is configured and arranged so as to make a water flow circumventing the water pump possible.

In this way, it is also possible to use a water pump through which little or no water can flow when it is deactivated, for example a displacement pump. In this case, there is the option of passing the water for example through the bypass pipe instead of through the water pump when the pump is deactivated. Further, the bypass pipe can be used so as to fill up the water reservoir, in such a way that it is possible to avoid relatively large flow amounts having to flow through the water pump during filling.

In accordance with one embodiment of the present disclosure, an aircraft is provided which comprises a pressure supply system for a fresh water system in accordance with the above embodiments and a bleed air source, the bleed air source being connected to the bleed air inlet of the water reservoir.

In this way, a bleed air source can be connected directly to the pressure supply system. A bleed air source may for example be an engine of an aircraft, which provides bleed air without any major additional expense.

In accordance with one embodiment of the present disclosure, a water supply pipe is provided in the aircraft downstream from the water pump, the water supply pipe being connected to at least one water tapping point.

In this way a water tapping point, such as a water tap, a toilet flush or a cooking means, can be connected to the fresh water system via the water supply pipe and supplied with water via the pressure supply system.

In accordance with one embodiment of the present disclosure, the water supply pipe is connected to the water reservoir in a circuit.

In this way, the water can circulate even when no water is being drawn at the tapping points, in such a way that on the one hand, the water can be subjected to a cleaning process cyclically, and on the other hand, the water can be prevented from freezing in the pipe system, for example at low temperatures.

It should be noted that the individual features, as disclosed above, may of course also be combined with one another, and this may also in some cases provide advantageous effects which go beyond the sum of the individual effects.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein:

FIG. 1 shows a schematic arrangement and a schematic construction of a pressure supply system in connection with a fresh water supply system.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

FIG. 1 shows a schematic construction of a pressure supply system in connection with a fresh water supply system. In the arrangement shown in FIG. 1, the operation and the construction of the pressure supply system are illustrated by way of a pressure supply system or a fresh water supply system of an aircraft. In this context, the dashed line 2 represents the boundary of the aircraft, a region outside the aircraft cabin being located above the boundary line and a cabin region of the aircraft being located below the dashed line. Although, according to the drawing, the pipes comprising the negative pressure valve 15, the overpressure valve 17 and/or the air pump 40 discharge outside the cabin or the aircraft, the pipes comprising the negative pressure valve 15, the overpressure valve 17 and/or the air pump 40 may also discharge inside the cabin or the aircraft.

In this context, the pressure supply system 1 comprises a water reservoir 10, which may for example be a tank or a tank system in an aircraft. The water reservoir comprises a bleed air inlet 11, at which for example a bleed air source 20 can be attached for example via a corresponding return valve 22. A bleed air source may for example be an engine or the engine bleed air system or another assembly of the aircraft which generates pressurized air. The bleed air can load the water reservoir with a pressure, via the corresponding pipe and the bleed air inlet 11, in such a way that the water which is located in the water reservoir 10 can reach for example a pump 30 via the water outlet 12 while loaded with pressure.

This pump 30 may for example be a pump which makes it possible for water to flow through even when the pump is not in operation. This may for example be a rotary pump. If a corresponding bypass 37 is provided which leads past the pump 30, the pump 30 may also for example be configured as a displacement pump, since in this case the water can also flow into the water supply pipe 72, 74 via the bypass pipe 37 and the bypass valve 38 when the pump is idle.

Downstream from the water pump, a pressure sensor 31 may for example be provided, which supplies a correspondingly measured pressure value to a water pump control system 32, in such a way that the water pump control system 32 can control or regulate the water pump 30, in such a way that a constant pressure can be maintained downstream from the water pump 30 and can be kept for example in a nominal operating pressure range. In this way only the water pump has to be controlled, and not the bleed air.

Via a further pipe 72, the water can for example reach a tapping point 70, which can be actuated via a tapping point valve 71. A tapping point of this type may for example be a water tap, a toilet flush, a showering or bathing means or a cooking means. Further, a water inlet pipe 73 may be provided, via which for example the water reservoir 10 can be filled. This filling may take place either via the bypass pipe 37 when the bypass valve 38 is open or else by a backwards flow through the pump 30. However, the pipe 73 may also be used so as to release all of the water in the fresh water system, for example when cleaning or maintenance cycles are being carried out. Via a corresponding circulation terminal 16, the water supply pipe 72 can be passed back into the water reservoir. In this context, the circulation pipe may discharge both above and below the water level.

Moreover, the water reservoir may comprise a negative pressure valve 15, which for example prevents the pump from generating a negative pressure, which can lead to the water reservoir collapsing, in the water reservoir when there is no bleed air pressure loading and the pump 30 is running. This may occur if for example the bleed air supply system is inactive during aircraft maintenance operations on the ground, but the water system is intended to continue to be active, in pumping operation. Moreover, an overpressure protection valve 17 may be provided, which for example prevents uncontrollably high bleed air pressure from damaging the water reservoir and prevents the water supply pressure from being able to reach undesirably high levels. Both the negative pressure valve and the overpressure valve may discharge into a pipe which leads outside or inside the aircraft cabin region.

Moreover, an air pump 40 may be provided which, additionally or instead of the bleed air source, provides an overpressure in the water reservoir. In other words, the air pump 40 may optionally also be attached to the bleed air inlet 11. In this way, particular redundancies may be provided, in such a way that for example one of the three pressure generator assemblies, the bleed air source 20, the water pump 30 and the air pump 40, can fail or does not have to be operated, and a particular minimum operating pressure or nominal operating pressure can be achieved nevertheless.

It should be noted that aside from the field of application in aircraft, the various teachings of the present disclosure can also be applied in other means of transport, such as trains, buses or ships.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. An aircraft, comprising:
a pressure supply system for a fresh water system including a water reservoir having a bleed air inlet for attaching a bleed air source and a water outlet, and a water pump arranged downstream from the water outlet,
a bleed air source connected to the bleed air inlet of the water reservoir,
wherein the water pump is configured so as to pressurize water which is loaded with bleed air from the water outlet until a predetermined nominal operating pressure range is achieved;
and wherein the pressure supply system has a predetermined minimum operating pressure, the minimum operating pressure being less than the nominal operating pressure range, a bleed air pressure and the water pump is dimensioned in such a way that the bleed air pressure and the water pump each individually provide at least the minimum operating pressure, and the bleed air pressure and the water pump together provide at least a pressure which is within the nominal operating pressure range.

2. The aircraft according to claim 1, further comprising a water pressure measurement means and a water pump control system, wherein the water pressure measurement means is arranged downstream from the water pump and coupled to the water pump control system, the water pump control system being configured to keep a water pressure downstream from the water pump in the predetermined nominal operating pressure range.

3. The aircraft according to claim 1, wherein the water pump is configured in such a way that when deactivated the water pump makes it possible for water to flow through.

4. The aircraft according to claim 3, wherein the water pump is a rotary pump.

5. The aircraft according to claim 1, wherein the bleed air pressure and the water pump are dimensioned in such a way that the bleed air pressure and the water pump each individually provide a maximum pressure which is below the nominal operating pressure range.

6. The aircraft according to claim 1, further comprising an air pump configured and arranged in such a way that the air pump uses pressurized air to load the water into the water reservoir.

7. The aircraft according to claim 1, further comprising a pressure limiting means configured and arranged so as to limit the pressure in the water reservoir to at most the nominal operating pressure range.

8. The aircraft according to claim 1, further comprising a bypass pipe configured and arranged to make a water flow circumventing the water pump.

9. A pressure supply system for a fresh water system for an aircraft comprising:
  a water reservoir having a bleed air inlet for attaching a bleed air source and a water outlet; and
  a water pump arranged downstream from the water outlet;
    wherein the water pump is configured so as to pressurize water which is loaded with bleed air pressure via the bleed air inlet with a further pressure downstream until a predetermined nominal operating pressure range is achieved; and
    wherein the pressure supply system has a predetermined minimum operating pressure, the minimum operating pressure being less than the nominal operating pressure range, a bleed air pressure and the water pump is dimensioned in such a way that the bleed air pressure, and the water pump together provide at least a pressure, which is within the nominal operating pressure range.

10. The pressure supply system according to claim 9, further comprising a water pressure measurement means and a water pump control system, wherein the water pressure measurement means is arranged downstream from the water pump and coupled to the water pump control system, the water pump control system being configured to keep a water pressure downstream from the water pump in the predetermined nominal operating pressure range.

11. The pressure supply system according to claim 9, wherein the water pump is configured in such a way that when deactivated the water pump makes it possible for water to flow through.

12. The pressure supply system according to claim 11, wherein the water pump is a rotary pump.

13. The pressure supply system according to claim 9, wherein the bleed air pressure and the water pump is dimensioned in such a way that the bleed air pressure, and the water pump each individually provide at least the minimum operating pressure.

14. The pressure supply system according to claim 13, wherein the bleed air pressure and the water pump are dimensioned in such a way that the bleed air pressure and the water pump each individually provide a maximum pressure which is below the nominal operating pressure range.

15. The pressure supply system according to claim 9, further comprising an air pump configured and arranged in such a way that the air pump uses pressurized air to load water into the water reservoir.

16. The pressure supply system according to claim 9, further comprising a pressure limiting means configured and arranged so as to limit the pressure in the water reservoir to at most the nominal operating pressure range.

17. The pressure supply system according to claim 9, further comprising a bypass pipe configured and arranged to provide a water flow circumventing the water pump.

18. The pressure supply system according to claim 9, wherein the bleed air source is connected to the bleed air inlet of the water reservoir.

* * * * *